Figure 1:
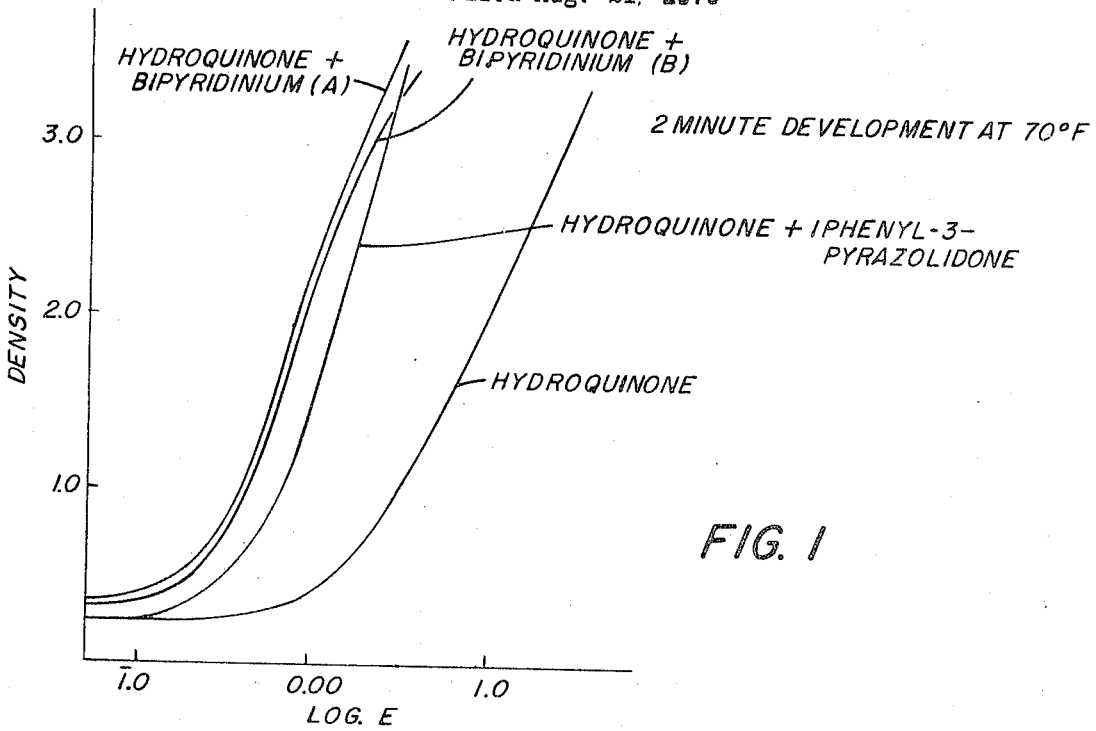
Figure 2:
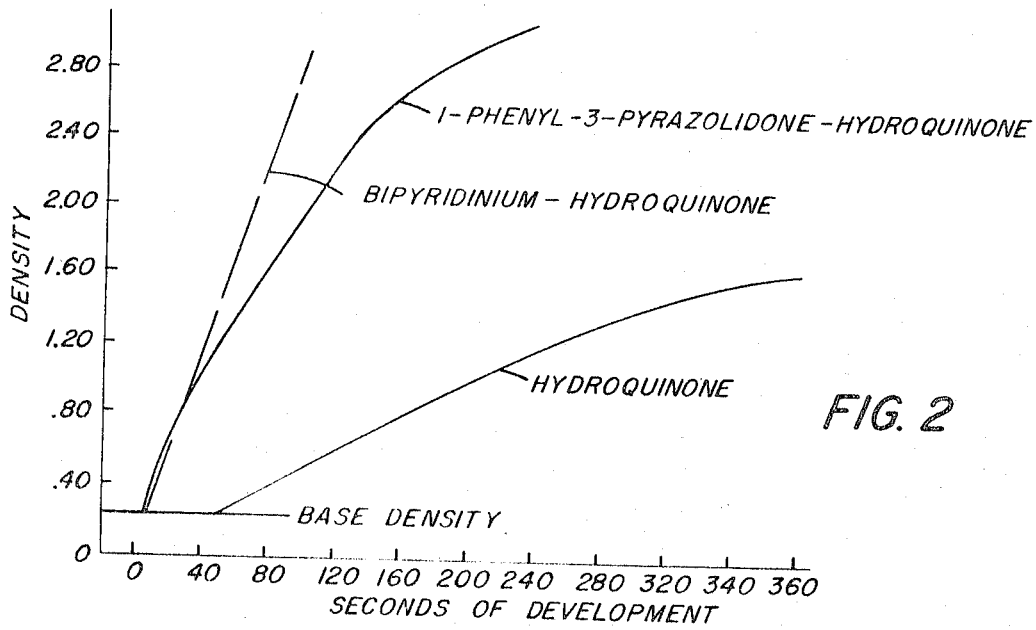

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 14, 1972

896 O.G. 420

T896,022

PHOTOGRAPHIC DEVELOPER COMPOSITIONS AND METHOD

Leslie A. Williams, c/o Kodak Limited, London, England, and William E. Lee, Kodak Park Works, Rochester, N.Y. 14650

Filed Aug. 21, 1970, Ser. No. 65,828

**Int. Cl. G03c *5/30***

U.S. Cl. 96—66.3

1 Sheet Drawing. 26 Pages Specification

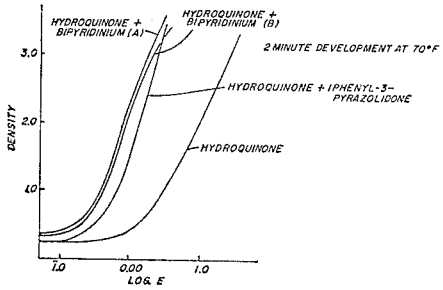

The silver halide developing activity of photographic developing agents such as hydroquinone or ascorbic acid is increased by incorporating in an alkaline solution of the developing agent a bis quaternary salt of a 2,2′- or a 4,4′-bipyridyl compound, such as 1,1′-dialkyl-4,4′-bipyridinium dibromide.

March 14, 1972 L. A. WILLIAMS ET AL T896,022

PHOTOGRAPHIC DEVELOPER COMPOSITIONS AND METHOD

Filed Aug. 21, 1970

WILLIAM E. LEE
LESLIE A. WILLIAMS
INVENTORS

BY Byron B. King

ATTORNEY